United States Patent [19]

Marbrow

[11] Patent Number: 4,897,377
[45] Date of Patent: Jan. 30, 1990

[54] RECEIVER SHEET

[75] Inventor: Richard A. Marbrow, Middlesbrough, England

[73] Assignee: Imperial Chemical Industries PLC, London, England

[21] Appl. No.: 183,147

[22] Filed: Apr. 19, 1988

[30] Foreign Application Priority Data

Apr. 24, 1987 [GB] United Kingdom ............... 8709797

[51] Int. Cl.⁴ .................. B41M 5/035; B41M 5/26
[52] U.S. Cl. ............................ 503/227; 8/471;
428/195; 428/304.4; 428/318.4; 428/323;
428/330; 428/336; 428/480; 428/913; 428/914
[58] Field of Search ............... 8/471; 428/480, 913,
428/914, 195, 304.4, 318.4, 323, 330, 336;
503/227

[56] References Cited

U.S. PATENT DOCUMENTS 4,097,230 6/1978 Sandhu .................... 428/480
4,585,687 4/1986 Posey et al. ............... 428/480
4,720,480 1/1988 Ito et al. .................. 503/227

FOREIGN PATENT DOCUMENTS 2148292 7/1987 Japan ...................... 503/227

Primary Examiner—Bruce H. Hess
Attorney, Agent, or Firm—Cushman, Darby & Cushman

[57] ABSTRACT

A thermal transfer printing (TTP) receiver sheet has a receiving layer comprising an amorphous synthetic thermoplastics polymer.

9 Claims, 1 Drawing Sheet

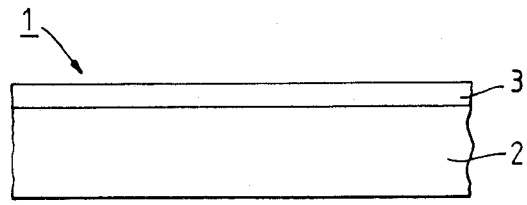
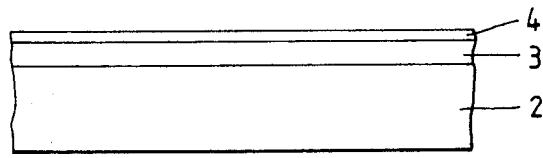
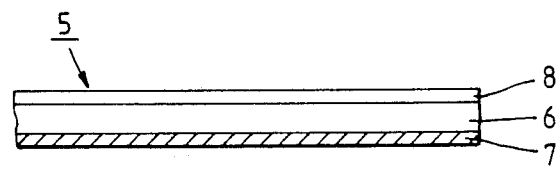
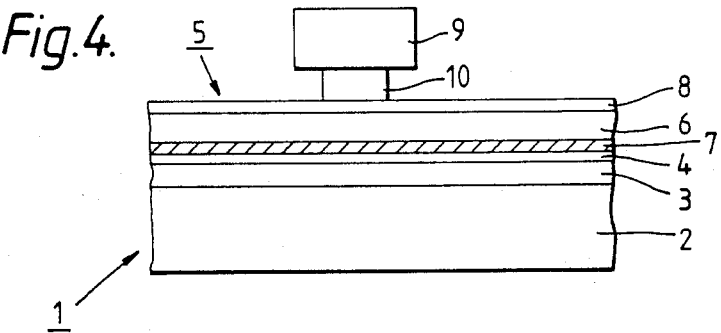
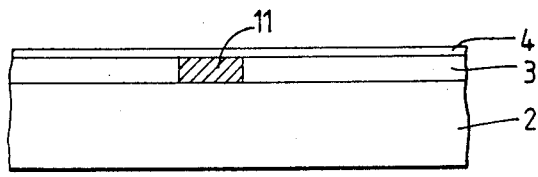

RECEIVER SHEET

BACKGROUND OF THE INVENTION (a) Technical Field of Invention

This invention relates to thermal transfer printing and, in particular, to a thermal transfer printing receiver sheet for use with an associated donor sheet.

(b) Background of the Art

Currently available thermal transfer printing (TTP) techniques generally involve the generation of an image on a receiver sheet by thermal transfer of an imaging medium from an associated donor sheet. The donor sheet typically comprises a supporting substrate of paper, synthetic paper or a polymeric film material coated with a transfer layer comprising a sublimable dye incorporated in an ink medium usually comprising a wax and/or a polymeric resin binder. The associated receiver sheet usually comprises a supporting substrate, of a similar material, having on a surface thereof a dye-receptive, polymeric receiving layer. When an assembly, comprising a donor and a receiver sheet positioned with the respective transfer and receiving layers in contact, is selectively heated in a patterned area derived, for example- from an information signal, such as a television signal, dye is transferred from the donor sheet to the dye-receptive layer of the receiver sheet to form therein a monochrome image of the specified pattern. By repeating the process with different monochrome dyes, a full coloured image is produced on the receiver sheet.

To facilitate separation of the imaged sheet from the heated assembly, at least one of the transfer layer and receiving layer may be associated with a release medium, such as a silicone oil.

The commercial success of a TTP system depends, inter alia, on the development of an image having adequate intensity, contrast and definition. Optical Density of the image is therefore an important criterion, but unfortunately, the presence of a release medium, although desirable to prevent sticking of the transfer layer to the receiving layer—both of which are in a molten state during the transfer process, may inhibit migration of the dye into the receiving layer, thereby reducing the optical density of the resultant image. The problem of inadequate optical density is particularly acute in the presence of a substantially cross-linked release medium.

Although the intense, localised heating required to effect development of a sharp image may be applied by various techniques, including laser beam imaging, a convenient and widely employed technique of thermal printing involves a thermal print-head, for example, of the dot matrix variety in which each dot is represented by an independent heating element (electronically controlled, if desired). A problem associated with such a contact print-head is the deformation of the receiver sheet resulting from pressure of the respective elements on the heated, softened assembly. This deformation manifests itself as a reduction in the surface gloss of the receiver sheet, and is particularly significant in receiver sheets the surface of which is initially smooth and glossy, i.e. of the kind which is in demand in the production of high quality art-work. A further problem associated with pressure deformation is the phenomenon of "strike-through" in which an impression of the image is observed on the rear surface of the receiver sheet, i.e. the free surface of the substrate remote from the receiving layer.

(c) The Prior Art

Various receiver sheets have been proposed for use in TTP processes. For example, EP-A-0133012 discloses a heat transferable sheet having a substrate and an image-receiving layer thereon, a dye-permeable releasing agent, such as silicone oil, being present either in the image-receiving layer or as a release layer on at least part of the image receiving layer. Materials identified for use in the substrate include condenser paper, glassine paper, parchment paper, or a flexible thin sheet of a paper or plastics film (including polyethylene terephthalate) having a high degree of sizing, although the exemplified substrate material is primarily a synthetic paper—believed to be based on a propylene polymer. The thickness of the substrate is ordinarily of the order of 3 to 50 $\mu$m. The image-receiving layer may be based on a resin having an ester, urethane, amide, urea, or highly polar linkage.

Related European patent application EP-A-0133011 discloses a heat transferable sheet based on similar substrate and imaging layer materials save that the exposed surface of the receptive layer comprises first and second regions respectively comprising (a) a synthetic resin having a glass transition temperature of from $-100°$ to $20°$ C. and having a polar group, and (b) a synthetic resin having a glass transition temperature of $40°$ C. or above. The receptive layer may have a thickness of from 3 to 50 $\mu$m when used in conjunction with a substrate layer, or from 60 to 200 $\mu$m when used independently.

As hereinbefore described, problems associated with commercially available TTP receiver sheets include inadequate intensity and contrast of the developed image, reduction in gloss of the imaged sheet, and strike-through of the image to the rear surface of the sheet.

We have now devised a receiver sheet for use in a TTP process which overcomes or substantially eliminates the aforementioned defects.

SUMMARY OF THE INVENTION

Accordingly, the present invention provides a thermal transfer printing receiver sheet for use in association with a compatible donor sheet, the receiver sheet comprising a supporting substrate having, on at least one surface thereof, a dye-receptive receiving layer to receive a dye thermally transferred from the donor sheet, wherein (a) the substrate comprises an opaque, molecularly oriented film of a synthetic linear polyester, and (b) the at least one receiving layer has a thickness not exceeding 7.5 $\mu$m and, comprises a dye-receptive, essentially amorphous synthetic thermoplastics polymer.

The invention also provides a method of producing a thermal transfer printing receiver sheet for use in association with a compatible donor sheet, comprising forming a supporting substrate and providing, on at least one surface thereof, a dye-receptive receiving layer to receive a dye thermally transferred from the donor sheet, (a) the substrate comprises an opaque, molecularly oriented film of a synthetic linear polyester, and (b) the at least one receiving layer has a thickness not exceeding 7.5 $\mu$m, and comprises a dye-receptive, essentially amorphous, synthetic thermoplastics polymer.

DETAILED DESCRIPTION AND PREFERRED EMBODIMENTS OF THE INVENTION

In the context of the invention the following terms are to be understood as having the meanings hereto assigned:

sheet: includes not only a single, individual sheet, but also a continuous web or ribbon-like structure capable of being sub-divided into a plurality of individual sheets.

compatible: in relation to a donor sheet, indicates that the donor sheet is impregnated with a dyestuff which is capable of migrating, under the influence of heat, into, and forming an image in, the receiving layer of a receiver sheet placed in contact therewith.

opaque: means that the substrate of the receiver sheet is substantially impermeable to visible light.

voided: indicates that the substrate of the receiver sheet comprises a cellular structure containing at least a proportion of discrete, closed cells.

film: is a self-supporting structure capable of independent existence in the absence of a supporting base.

A synthetic linear polyester suitable for use in the formation of a substrate for a receiver sheet according to the invention may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, e.g. ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British patent 838 708.

A film substrate for a receiver sheet according to the invention may be uniaxially oriented, but it preferably biaxially oriented by drawing in two mutually perpendicular directions in the plane of the film to achieve a satisfactory combination of mechanical and physical properties. Formation of the film may be effected by any process known in the art for producing an oriented polyester film—for example, a tubular or flat film process.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is usually effected so that the dimension of the oriented polyester film is from 2.5 to 4.5 its original dimension in the, or each, direction of stretching.

A stretched film may be, and preferably is, dimensionally stabilised by heat-setting under dimensional restraint at a temperature above the glass transition temperature of the film-forming polyester but below the melting temperature thereof, to induce crystallisation of the polyester.

A receiver sheet substrate is conveniently rendered opaque by incorporation into the film-forming synthetic linear polyester of an effective amount of an opacifying agent. Opacity depends, inter alia, on the film thickness and filler content, but an opaque substrate film will preferably exhibit a Transmission Optical Density (Sakura Densitometer, type PDA 65, transmission mode) of from 0.75 to 1.75, and particularly of from 1.2 to 1.5.

In a preferred embodiment of the invention the opaque substrate is voided, as hereinbefore defined. It is therefore preferred to incorporate into the polyester an effective amount of an agent which is capable of generating a voided substrate structure. Suitable voiding agents, which also confer opacity, include an incompatible resin filler, a particulate inorganic filler or a mixture of two or more such fillers.

By an "incompatible resin" is meant a resin which either does not melt, or which is substantially immiscible with the linear polyester, at the highest temperature encountered during extrusion and fabrication of the polyester film. Such resins include polyamides and olefin polymers, particularly a homo- or co-polymer of a mono-alpha-olefin containing up to 6 carbon atoms in its molecule.

Particulate inorganic fillers suitable for generating an opaque voided polyester substrate include conventional inorganic pigments and fillers, and particularly metal or metalloid oxides, such as alumina, silica and titania, and alkaline earth metal salts, such as the carbonates and sulphates of calcium and barium. Barium sulphate is a particularly preferred filler which also functions as a voiding agent.

Suitable fillers may be homogeneous and consist essentially of a single filler material or compound such as titanium dioxide or barium sulphate alone. Alternatively, at least a proportion of the filler may be heterogeneous, the primary filler material being associated with an additional modifying component. For example, the primary particle may be treated with a surface-modifier such as a pigment, soap, surfactant, coupling agent or other modifier, to promote or alter the degree to which the filler is compatible with the substrate polyester.

Production of a substrate having satisfactory degrees of opacity, voiding and whiteness requires that the filler should be finely-divided, and the average particle size thereof is desirably from 0.1 to 10 microns ($\mu$m) provided that the actual particle size of 99.9% by number of the particles does not exceed 30 $\mu$m. Preferably, the filler has an average particle size of from 0.1 to 1.0 $\mu$m, and particularly preferably from 0.2 to 0.75 $\mu$m. Decreasing the particle size improves the gloss of the substrate.

Particle sizes may be measured by electron microscope, coulter counter or sedimentation analysis and the average particle size may be determined by plotting a cumulative distribution curve representing the percentage of particles below chosen particle sizes.

It is preferred that none of the filler particles incorporated into the film support according to this invention should have an actual particle size exceeding 30 μm. Particles exceeding such a size may be removed by sieving processes which are known in the art. However, sieving operations are not always totally successful in eliminating all particles greater than a chosen size. In practice, therefore, the size of 99.9% by number of the particles should not exceed 30 μm. Most preferably the size of 99.9% of the particles should not exceed 20 μm.

Incorporation of the opacifying/voiding agent into the polyester substrate may be effected by conventional techniques—for example, by mixing with the monomeric reactants from which the polyester is derived, or by dry blending with the polyester in granular or chip form prior to formation of a film therefrom.

The amount of filler, particularly of barium sulphate, incorporated into the linear polyester desirably should be not less than 5% nor exceed 50% by weight, based on the weight of the linear polyester. Particularly satisfactory levels of opacity and gloss are achieved when the concentration of filler is from about 8 to 30%, and especially from 15 to 20%, by weight, based on the weight of the linear polyester.

Other additives, generally in relatively small quantities, may optionally be incorporated into the film substrate. For example, china clay may be incorporated in amounts of up to 25% to promote voiding, optical brighteners in amounts up to 1500 parts per million to promote whiteness, and dyestuffs in amounts of up to 10 parts per million to modify colour, the specified concentrations being by weight, based on the weight of the linear polyester.

Thickness of the substrate may vary depending on the envisaged application of the receiver sheet but, in general, will not exceed 250 μm, and will preferably be in a range from 50 to 190 μm, particularly from 145 to 180 μm.

A receiver sheet having a substrate of the kind hereinbefore described offers numerous advantages including (1) a degree of whiteness and opacity essential in the production of prints having the intensity, contrast and feel of high quality art-work, (2) a degree of rigidity and stiffness contributing to improved resistance to surface deformation and image strike-through associated with contact with the print-head and (3) a degree of stability, both thermal and chemical, conferring dimensional stability and curl-resistance.

When TTP is effected directly onto the surface of a substrate of the kind hereinbefore described, the optical density of the developed image tends to be low and the quality of the resultant print is generally inferior. A receiving layer is therefore required on at least one surface of the substrate, and desirably exhibits (1) a high receptivity to dye thermally transferred from a donor sheet, (2) resistance to surface deformation from contact with the thermal printhead to ensure the production of an acceptably glossy print, and (3) the ability to retain a stable image.

A receiving layer satisfying the aforementioned criteria comprises an essentially amorphous, dye-receptive, synthetic thermoplastics polymer having a layer thickness not exceeding 7.5 μm. The dry thickness of the receiving layer governs, inter alia, the optical density of the resultant image developed in a particular receiving polymer, and preferably is within a range of from 0.5 to 5.0 μm. Furthermore, it has been observed that by careful control of the receiving layer thickness to less than 7.5 μm, in association with an opaque/voided polyester substrate layer of the kind herein described, a surprising and significant improvement in resistance to surface deformation is achieved.

An amorphous, dye-receptive, polymer for use in the receiving layer, and offering adequate adhesion to the substrate layer, suitably comprises an amorphous polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory dye-receptivity and deformation resistance in the amorphous state are those of ethylene terephthalate and ethylene isophthalate, especially in the molar ratios of from 50 to 90 mole % ethylene terephthalate and correspondingly from 50 to 10 mole % ethylene isophthalate. Preferred copolyesters comprise from 65 to 85 mole % ethylene terephthalate and from 35 to 15 mole % ethylene isophthalate, especially a copolyester of about 82 mole % ethylene terephthalate and about 18 mole % ethylene isophthalate.

Formation of an amorphous receiving layer on the substrate layer may be effected by conventional techniques—for example, by casting the amorphous polymer onto a preformed substrate layer. Conveniently, however, formation of a composite sheet (substrate and receiving layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a composite sheet.

A coextruded sheet is stretched to effect molecular orientation of the substrate, and preferably heat-set, as hereinbefore described. Generally, the conditions applied for stretching the substrate layer may induce partial crystallisation of the receiving polyester and in such cases it is preferred to heat set under dimensional restraint at a temperature greater than the crystalline melting temperature of the receiving polymer and permit or cause the composite to cool to ensure that the receiving polymer remains essentially amorphous. Heat-setting of a receiver sheet comprising a polyester substrate and a copolyester receiving layer is conveniently effected at a temperature within a range of from 200° to 250° C.

In a preferred embodiment of the invention a receiver sheet is rendered resistant to ultra violet (UV) radiation by incorporation of a UV stabiliser. Although the stabiliser may be present in any of the layers of the receiver sheet, it is preferably present in the receiving layer. The stabiliser may comprise an independent additive or, preferably, a copolymerised residue in the chain of the receiving polymer. In particular, when the receiving polymer is a polyester, the polymer chain conveniently comprises a copolymerised esterification residue of an aromatic carbonyl stabiliser. Suitably, such esterification residues comprise the residue of a di(hydroxyalkoxy)coumarin—as disclosed in European Patent Publication EP-A-31202, the residue of a 2-hydroxy-di(hydroxyalkoxy)benzophenone —as disclosed in EP-A-31203, the residue of a bis(hydroxyalkoxy)xanth-9-one—as disclosed in EP-A-6686, and, particularly preferably, a residue of a hydroxy-bis(hydroxyalkoxy)-xanth-9-one - as disclosed in EP-A-76582. The alkoxy groups in the aforementioned stabilisers conveniently contain from 1 to 10 and preferably from 2 to 4 carbon atoms, for example—an ethoxy group. The content of esterification residue is conveniently from 0.01 to 30%, and preferably from 0.05 to 10%, by weight of the total receiving polymer. A particularly preferred residue is a residue of a 1-hydroxy-3, 6-bis(hydroxyalkoxy)xanth-9-one.

To prevent sticking of the donor and receiver sheets during the TTP process, the receiver sheet may comprise a release medium, which may be present either within the receiving layer or as a discrete layer on at least part of the exposed surface of the receiving layer remote from the substrate.

The release medium should be permeable to the dye transferred from the donor sheet, and suitably comprises an organopolysiloxane resin, a preferred resin being that available from Dow Corning Corp under the trade name SYL-OFF 22.

The release medium may be blended into the receiving polyester in an amount up to about 50% by weight thereof, or applied to the exposed surface thereof in an appropriate solvent or dispersant and thereafter dried, for example—at temperatures of from 100° to 160° C., preferably from 100° to 120° C., to yield a cured release layer having a dry thickness of up to about 5 μm, preferably from 0.025 to 2.0 μm.

If desired, the release medium may additionally comprise a surfactant to promote spreading of the medium and to improve the permeability thereof to dye transferred from the donor sheet.

A release medium of the kind described yields a receiver sheet having excellent optical characteristics, devoid of surface blemishes and imperfections, which is permeable to a variety of dyes, and confers multiple, sequential release characteristics whereby a receiver sheet may be successively imaged with different monochrome dyes to yield a full coloured image.

The invention is illustrated by reference to the accompanying drawings in which:

FIG. 1 is a schematic elevation (not to scale) of a portion of a TTP receiver sheet 1 comprising a polymeric supporting substrate 2 having, on one surface thereof, a dye-receptive receiving layer 3, FIG. 2 is a similar, fragmentary schematic elevation in which the receiver sheet additionally comprises a release layer 4, FIG. 3 is a schematic, fragmentary elevation (not to scale) of a compatible TTP donor sheet 5 comprising a polymeric substrate 6 having on one surface (the front surface) thereof a transfer layer 7 comprising a sublimable dye in a resin binder, and on a second surface (the rear surface) thereof a polymeric protective layer 8, FIG. 4 is a schematic elevation of a TTP process, and FIG. 5 is a schematic elevation of an imaged receiver sheet.

Referring to the drawings, and in particular to FIG. 4, a TTP process is effected by assembling a donor sheet and a receiver sheet with the respective transfer layer 7 and release layer 4 in contact. An electrically-activated thermal print-head 9 comprising a plurality of print elements 10 (only one of which is shown) is then placed in contact with the protective layer of the donor sheet. Energisation of the print-head causes selected individual print-elements 10 to become hot, thereby causing dye from the underlying region of the transfer layer to sublime through dye-permeable release layer 4 and into receiving layer 3 where it forms an image 11 of the heated element(s). The resultant imaged receiver sheet, separated from the donor sheet, is illustrated in FIG. 5 of the drawings.

By advancing the donor sheet relative to the receiver sheet, and repeating the process, a multi-colour image of the desired form may be generated in the receiving layer.

The invention is further illustrated by reference to the following Examples.

EXAMPLE 1

To prepare a receiver sheet, separate streams of a first polymer comprising polyethylene terephthalate containing 18% by weight, based on the weight of the polymer, of a finely-divided particulate barium sulphate filler having an average particle size of 0.7 μm and a second polymer comprising an unfilled copolyester of 82 mole % ethylene terephthalate and 18 mole % ethylene isophthalate were supplied from separate extruders to a single-channel coextrusion assembly, and extruded through a film-forming die onto a water-cooled rotating, quenching drum to yield an amorphous cast composite extrudate. The cast extrudate was heated to a temperature of about 80° C. and then stretched longitudinally at a forward draw ratio of 3.2:1. The longitudinally stretched film was then heated to a temperature of about 96° C. and stretched transversely in a stenter oven at a draw ratio of 3.4:1. The stretched film was finally heat-set under dimensional restraint in a stenter oven at a temperature of about 225° C.

The resultant sheet comprised an opaque, voided primary layer of filled polyethylene terephthalate of about 150 μm thickness having on one surface thereof a receiving layer of the isophthalate-terephthalate copolymer of about 7 μm thickness. By virtue of the heat-setting temperature employed, the receiving layer was of an essentially amorphous nature.

The printing characteristics of the receiver sheet were assessed using a donor sheet comprising a biaxially oriented polyethylene terephthalate substrate of about 6 μm thickness having on one surface thereof a transfer layer of about 2 μm thickness comprising a magenta dye in a cellulosic resin binder.

A sandwich comprising a sample of the donor and receiver sheets with the respective transfer and receiving layers in contact was placed on the rubber-covered drum of a thermal transfer printing machine and contacted with a print head comprising a linear array of pixcels spaced apart at a linear density of 6/mm. On selectively heating the pixcels in accordance with a pattern information signal to a temperature of about 350° C. (power supply 0.32 watt/pixcel) for a period of 10 milliseconds (ms), magenta dye was transferred from the transfer layer of the donor sheet to form a corresponding image of the heated pixcels in the receiving layer of the receiver sheet.

After stripping the transfer sheet from the receiver sheet, the band image on the latter was assessed using a Sakura Densitometer, type PDA 65, operating in the reflection mode with a green filter. The measured reflection optical density (ROD) of the inked image was 2.52.

When imaged under identical conditions, a receiver sheet comprising a single layer of the barium sulphate-filled polyethylene terephthalate polymer (i.e. without a coextruded layer of the copolyester) formed an image having a measured ROD of 1.4.

Examination of a cross-section of the imaged composite sheet by transmitted light microscopy revealed that depressions of about 2.7 $\mu$m depth had been created in the surface of the receiving layer by the heated pixcels, i.e. a Surface Deformation of 2.7.

EXAMPLE 2

The procedure of Example 1 was repeated, save that the amorphous receiving layer comprised an unfilled copolyester of 65 mole ethylene terephthalate and 35 mole % of ethylene isophthalate.

The observed ROD of the resultant magenta image was 2.7, and the Surface Deformation of the imaged sheet was also of the order of 2.7.

EXAMPLE 3

The procedure of Example 1 was repeated, save that the amorphous receiving layer was formed from an unfilled polyester resin derived from terephthalic acid, ethylene glycol, triethyleneglycol and neopentyl glycol in a molar ratio of 10:7:2:1.

The observed ROD of the resultant magenta image was 2.8, and observed Surface Deformation was 2.7.

EXAMPLE 4

An oriented receiver sheet identical to that described in Example 1 was further coated with an aqueous dispersion comprising 1% by weight (based on the weight of the dispersion) of an organopolysiloxane resin (SYL-OFF 22 : Dow Corning Corp) and 0.375% by weight of a polyalkylene oxide modified diethylpolysiloxane wetting agent (SILWET L77: Union Carbide Corp) and dried in an air oven at a temperature of 100° C. for 60 seconds to provide a cured release layer of about 0.1 $\mu$m thickness on the exposed surface of the receiving layer.

When imaged and assessed as described in Example 1, the imaged area of the sheet was found to have a measured ROD of 2.4, and a Surface Deformation of 2.7.

Stripping of the donor sheet from the imaged receiver sheet was facilitated by the presence thereon of the release layer.

EXAMPLES 5 to 7

The procedure of Example 1 was repeated, save that the thickness of the terephthalate - isophthalate (82:18) copolymer receiving layer was varied in turn to yield a series of receiver sheets the characteristics of which were as described in the accompanying Table.

TABLE

| Example | Receiver Layer Thickness ($\mu$m) | Surface* Deformation ($\mu$m) | Reflection* Optical Density |
|---|---|---|---|
| 5 | 0.7 | 0.27 | 2.35 |
| 6 | 1.35 | 0.5 | 2.80 |
| 7 | 2.65 | 1.1 | 2.66 |
| 1 | 7.0 | 2.7 | 2.52 |

*Measurements on samples imaged as described in Example 1, i.e. magenta dye; 0.32 watt/pixcel; 10 ms.

EXAMPLE 8

This is a comparative Example, not according to the invention.

The procedure of Example 1 was repeated, save that heat-setting was effected at a temperature of about 185° C. whereby the copolymer receiving layer of 7 $\mu$m thickness was of an essentially crystalline nature.

The imaged composite sheet exhibited a reflection optical density of 2.3 and a surface deformation of 1.35.

EXAMPLES 9, 10

The procedure of Example 3 was repeated save that the amorphous receiving layer was of the thickness specified in the Table and that the primary support layer comprised polyethylene terephthalate containing 6% by weight of polypropylene of melt flow index 4.0 dg/min.

The receiver sheets were imaged using the magenta dye donor sheets, the contact time in the thermal printer being variously 7, 5 and 3 milliseconds at a temperature of about 350° C.

Reflection optical densities are recorded in the Table.

TABLE

| Example | Receiver Layer Thickness ($\mu$m) | Reflection Optical Density (7ms) | (5ms) | (3ms) |
|---|---|---|---|---|
| 9 | 2 | 1.62 | 0.92 | 0.40 |
| 10 | 4 | 1.56 | 0.83 | 0.33 |

I claim:

1. A thermal transfer printing receiver sheet for use in association with a compatible donor sheet, the receiver sheet comprising a supporting substrate having, on at least one surface thereof, a dye-receptive receiving layer to receive a dye thermally transferred from the donor sheet, wherein
   (a) the substrate comprises an opaque, molecularly oriented film of a synthetic linear polyester, and
   (b) the at least one receiving layer has a thickness not exceeding 7.5 $\mu$m, and comprises a dye-receptive, essentially amorphous, synthetic polyester resin containing one or more glycols selected from the group consisting of ethylene glycol, diethylene glycol, triethylene glycol and neopentyl glycol.

2. A receiver sheet according to claim 1 wherein the substrate is voided, thus containing at least a proportion of discrete closed cells.

3. A receiver sheet according to claim 2 wherein the substrate contains an effective amount of a voiding agent selected from the group comprising an incompatible resin filler and a particulate inorganic filler.

4. A receiver sheet according to claim 3 wherein the average particle size of the inorganic filler is from 0.1 to 10.0 $\mu$m, the actual particle size of 99.9% by number of the particles not exceeding 30 $\mu$m.

5. A receiver sheet according to claim 3 wherein the inorganic filler comprises barium sulphate.

6. A receiver sheet according to claim 1 wherein the thickness of the receiving layer is from 0.5 to 5.0 $\mu$m.

7. A receiver sheet according to claim 1 wherein the dye-receptive polymer comprises a copolyester.

8. A receiver sheet according to claim 7 wherein the dye-receptive polymer comprises a copolymer of ethylene terephthalate and ethylene isophthalate.

9. A receiver sheet according to claim 1 comprising a receiving layer additionally being provided with a release medium.

* * * * *